US012425780B2

(12) United States Patent
Zhang

(10) Patent No.: US 12,425,780 B2
(45) Date of Patent: Sep. 23, 2025

(54) AUDIO SIGNAL PROCESSING METHOD AND APPARATUS, DEVICE AND STORAGE MEDIUM

(71) Applicant: GOERTEK INC., Shandong (CN)

(72) Inventor: Hengsheng Zhang, Shandong (CN)

(73) Assignee: GOERTEK INC., Shandong (CN)

( * ) Notice: Subject to any disclaimer, the term of this patent is extended or adjusted under 35 U.S.C. 154(b) by 186 days.

(21) Appl. No.: 18/553,208

(22) PCT Filed: Dec. 20, 2021

(86) PCT No.: PCT/CN2021/139542
§ 371 (c)(1),
(2) Date: Sep. 29, 2023

(87) PCT Pub. No.: WO2022/206049
PCT Pub. Date: Oct. 6, 2022

(65) Prior Publication Data

US 2024/0187799 A1 Jun. 6, 2024

(30) Foreign Application Priority Data

Mar. 31, 2021 (CN) ......................... 202110347995.9

(51) Int. Cl.
*H04R 25/00* (2006.01)
*G10L 25/78* (2013.01)

(52) U.S. Cl.
CPC ............ *H04R 25/505* (2013.01); *G10L 25/78* (2013.01); *H04R 2225/43* (2013.01); *H04R 2430/01* (2013.01); *H04R 2460/13* (2013.01)

(58) Field of Classification Search
CPC .............. H04R 25/505; H04R 2225/43; H04R 2430/01; H04R 2460/13; G10L 25/78
USPC .................. 381/321, 104, 102, 312, 23.1, 1
See application file for complete search history.

(56) References Cited

U.S. PATENT DOCUMENTS

| | | | |
|---|---|---|---|
| 2010/0260364 A1 | 10/2010 | Merks | |
| 2015/0043762 A1 | 2/2015 | Kim et al. | |
| 2016/0066102 A1 | 3/2016 | Giese et al. | |

(Continued)

FOREIGN PATENT DOCUMENTS

| | | |
|---|---|---|
| CN | 101304455 A | 11/2008 |
| CN | 104012110 A | 8/2014 |
| CN | 107910011 A | 4/2018 |

(Continued)

*Primary Examiner* — Thjuan K Addy
(74) *Attorney, Agent, or Firm* — Ingrassia Fisher & Lorenz, LLP

(57) ABSTRACT

An audio signal processing method and apparatus, a device and a storage medium are disclosed. In the present disclosure, when the hearing aid is processing the audio signal, if it is detected that the bone conduction signal contains a voice signal, it is determined that the wearer is speaking. At this moment, the audio signal needs to be processed by using the preset amplification gain. Since the preset amplification gain is less than the amplification gain under normal operating status, it can prevent the volume and timbre from changing due to the fact that the hearing aid amplifies the voice of the wearer, so that the hearing aid wearers' subjective feeling of their own voice is consistent before and after wearing, thereby improving the wearing experience of hearing aid wearers.

10 Claims, 4 Drawing Sheets

(56) References Cited

U.S. PATENT DOCUMENTS

| | | | | |
|---|---|---|---|---|
| 2016/0320840 | A1* | 11/2016 | Hwang ................ | H04R 1/1041 |

FOREIGN PATENT DOCUMENTS

| | | | |
|---|---|---|---|
| CN | 108810778 | A | 11/2018 |
| CN | 109348338 | A | 2/2019 |
| CN | 110012406 | A | 7/2019 |
| CN | 110113688 | A | 8/2019 |
| CN | 110366086 | A | 10/2019 |
| CN | 110958551 | A | 4/2020 |
| CN | 110992967 | A | 4/2020 |
| CN | 111063363 | A | 4/2020 |
| CN | 111935573 | A | 11/2020 |
| CN | 112017696 | A | 12/2020 |
| CN | 113115190 | A | 7/2021 |
| EP | 2712211 | A1 | 3/2014 |

* cited by examiner

AUDIO SIGNAL PROCESSING METHOD AND APPARATUS, DEVICE AND STORAGE MEDIUM

CROSS-REFERENCE TO RELATED APPLICATIONS

This Application is a U.S. National-Stage entry under 35 U.S.C. § 371 based on International Application No. PCT/CN2021/139542, filed Dec. 20, 2021 which was published under PCT Article 21(2) and which claims priority to Chinese Application No. 202110347995.9, filed Mar. 31, 2021, which are all hereby incorporated herein in their entirety by reference.

TECHNICAL FIELD

This application pertains to the technical field of signal processing, more specifically, to an audio signal processing method and apparatus, a device and a storage medium.

BACKGROUND

As a tool that helps people to hear, the hearing aid increases sound intensity and can help some hearing impaired patients fully utilize residual hearing, thereby compensating for hearing loss caused by deafness. As a means of hearing rehabilitation, it cannot restore the hearing of hearing impaired patients to normal, but it can amplify the sound to a level that they can hear and help them more smoothly communicate with others.

At present, some hearing aid wearers feel that their sound is abnormal when speaking with the hearing aid turned on. This is because hearing aids not only amplify the voice of others, but also amplify the wearer's own voice. As the microphone of the hearing aid is closer to the mouth of the wearer, even if speaking with the same sound pressure, the hearing aid wearers hear their own voice louder than others' voice, and there is a feeling of amplification. In addition, such an amplification and air conduction way is different from the way people usually feel their own voice through bone conduction, which will lead to the change of the wearer's subjective perception of their own timbre and affect the experience of hearing aid wearers, and thus some patients with hearing loss are unwilling to wear the hearing aid. In addition, other objects, desirable features and characteristics will become apparent from the subsequent summary and detailed description, and the appended claims, taken in conjunction with the accompanying drawings and this background.

SUMMARY

The object of the present disclosure is to provide an audio signal processing method and apparatus, a device and a storage medium, which can prevent the change of hearing aid wearers' subjectively feeling of volume or timbre and the influence on the wearing experience of hearing aids due to hearing their own voice through both air and bone conduction.

To achieve the above object, the present disclosure provides an audio signal processing method applicable to a hearing aid. The method comprises the steps of:

- acquiring a bone conduction signal;
- detecting whether the bone conduction signal contains a voice signal; and

- if the bone conduction signal contains a voice signal, processing the audio signal by using a preset amplification gain, wherein the preset amplification gain is less than an amplification gain under normal operating status.

If the bone conduction signal does not contain a voice signal, the audio signal processing method further comprises the step of: processing the audio signal by using the amplification gain under normal operating status.

Before processing the audio signal by using the amplification gain under normal operating status, the method further comprises the steps of:

- determining current operating status;
- if the current operating status is normal operating status, performing the step of processing the audio signal by using the amplification gain under normal operating status; and
- if the current operating status is own voice processing status, adjusting the current operating status to the normal operating status, and performing the step of processing the audio signal by using the amplification gain under normal operating status.

Before processing the audio signal by using the preset amplification gain, the method further comprises the steps of:

- determining current operating status;
- if the current operating status is own voice processing status, performing the step of processing the audio signal by using the preset amplification gain; and
- if the current operating status is normal operating status, adjusting the current operating status to the own voice processing status, and performing the step of processing the audio signal by using the preset amplification gain.

The step of acquiring the bone conduction signal comprises: acquiring the bone conduction signal by a bone conduction sensor of the hearing aid with a preset length of time as a cycle.

The step of detecting whether the bone conduction signal contains a voice signal comprises: detecting whether the bone conduction signal contains a voice signal by a voice activity detection algorithm.

To achieve the above object, the present disclosure also provides an audio signal processing apparatus applicable to a hearing aid. The apparatus comprises:

- an acquisition module for acquiring a bone conduction signal;
- a detection module for detecting whether the bone conduction signal contains a voice signal; and
- a first processing module for, when the bone conduction signal contains a voice signal, processing the audio signal by using a preset amplification gain, wherein the preset amplification gain is less than an amplification gain under normal operating status.

The apparatus further comprises: a second processing module for, when the bone conduction signal does not contain a voice signal, processing the audio signal by using the amplification gain under normal operating status.

To achieve the above object, the present disclosure also provides an electronic device, which comprises:

- a memory for storing a computer program; and
- a processor for implementing the steps of the audio signal processing methods as described above when executing the computer program.

To achieve the above object, the present disclosure also provides a computer-readable storage medium having a computer program stored thereon, when the computer program is executed by a processor, the steps of the audio signal processing methods as described above are implemented.

It can be seen from the above solution that, the audio signal processing method according to an embodiment of the present disclosure comprises the steps of: acquiring a bone conduction signal; detecting whether the bone conduction signal contains a voice signal; and if the bone conduction signal contains a voice signal, processing the audio signal by using a preset amplification gain, wherein the preset amplification gain is less than an amplification gain under normal operating status.

It can be seen that, in this solution, when the hearing aid is processing the audio signal, if it is detected that the bone conduction signal contains a voice signal, it is determined that the wearer is speaking. At this moment, the audio signal needs to be processed by using the preset amplification gain. Since the preset amplification gain is less than the amplification gain under normal operating status, it can prevent the volume and timbre from changing due to the fact that the hearing aid amplifies the voice of the wearer, so that the hearing aid wearers' subjective feeling of their own voice is consistent before and after wearing, thereby improving the wearing experience of hearing aid wearers. The present disclosure also discloses an audio signal processing apparatus, a device and a storage medium, which can also achieve the above technical effects.

BRIEF DESCRIPTION OF DRAWINGS

The present invention will hereinafter be described in conjunction with the following drawing figures, wherein like numerals denote like elements, and.

DETAILED DESCRIPTION

Figure 1:
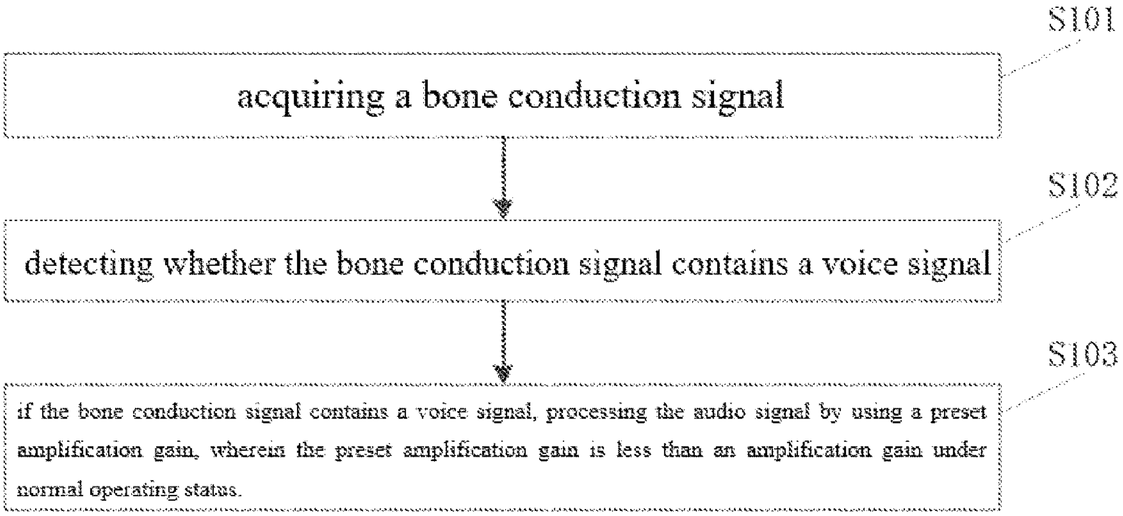
FIG. 1 is a flowchart of an audio signal processing method according to an embodiment of the present disclosure.

The following detailed description is merely exemplary in nature and is not intended to limit the invention or the application and uses of the invention. Furthermore, there is no intention to be bound by any theory presented in the preceding background of the invention or the following detailed description.

In order to make the objectives, technical solutions, and advantages of the present application clearer, the technical solutions of the present application will be described clearly and completely in conjunction with specific embodiments of the present application and corresponding drawings. Obviously, the described embodiments are only part of the embodiments of the present application, rather than all of the embodiments. Based on the embodiments in the present application, all other embodiments obtained by those of ordinary skill in the art without paying creative work shall fall within the protection scope of the present application.

It should be noted that when hearing aids amplify audio signals, they not only amplify other people's audio signals, but also amplify the wearer's own audio signals, so that the wearer's subjective feeling of the volume and timbre of their own audio changes, which results in a bad wearing experience. In order to solve this problem, in traditional processing methods, the own voice processing (OVP) technology is used to distinguish one's own voice from the voice of others. However, in these methods, there are difficulties in distinguishing one's own voice from the voice of others.

In the present disclosure, an own voice processing technology based on bone conduction sensor (voice pick-up sensor, VPU) is proposed to efficiently solve the problem of own voice processing of hearing aids. Specifically, in this solution, bone conduction signals are used to identify whether a user is speaking, thereby controlling the audio processing effect of the hearing aid. When the user speaks, the sound amplification function of the hearing aid is reduced or turned off by reducing the gain, so as to prevent the hearing aid from amplifying the own voice and changing the timbre. When the user does not speak, the sound amplification function of the hearing aid is activated, and the user can fully enjoy the benefits brought by the hearing aid. Moreover, in this solution, bone conduction signals are used to identify whether a user is speaking or not; compared with the pure voice signal processing in which voice print and the like are used, this solution is more simple, real-time and accurate, and truly makes the own voice processing technology practical.

The technical solutions in embodiments of the present disclosure will be described clearly and completely below with reference to the drawings in the embodiments of the present disclosure. Obviously, the embodiments as described are merely part of, rather than all, embodiments of the present disclosure. Based on the embodiments of the present disclosure, any other embodiment obtained by a person of ordinary skill in the art without paying any creative effort shall fall within the protection scope of the present disclosure.

Refer to FIG. 1, which is a flowchart of an audio signal processing method according to an embodiment of the present disclosure, the method is applicable to hearing aids, and specifically comprising the following steps:

S101. acquiring a bone conduction signal;

It should be noted that, when the user is speaking, the voice signal reaches the inner ear through two paths. One is the transmission to the inner ear through the vibration of skull, jaw, etc., which is called bone conduction. The other is that sound waves are transmitted to the middle ear through the outer ear canal, and then to the inner ear through the ossicular chain, which is called air conduction. Moreover, since the user's own voice is mainly transmitted to the inner ear through bone conduction to form hearing, in this solution, when identifying whether the wearer is speaking, it can be determined whether the wearer is speaking by analyzing the bone conduction signal.

In this solution, the executive body of the audio signal processing method is the hearing aid. The hearing aid determines whether the wearer is speaking through bone conduction signals, so as to adjust the signal amplification gain of the hearing aid, so that when the wearer is speaking, the signal amplification gain is reduced, thereby preventing the volume and timbre from changing due to the fact that the hearing aid amplifies the wearer's own voice. Moreover, since bone conduction sensors are not sensitive to voice signals transmitted from air conduction, this solution can acquire bone conduction signals through bone conduction sensors so as to improve the accuracy of bone conduction signals.

In this solution, when acquiring bone conduction signals, if the resource consumption of hearing aids is taken into consideration, the signal amplification gain may be adjusted by this solution after receiving the turn-on command triggered actively by the user. Of course, if the real-timeness of gain adjustment is taken into consideration, bone conduction signals may be acquired through the bone conduction sensor of the hearing aid with a preset length of time as a cycle, and the signal amplification gain is adjusted periodically. The wearer can flexibly choose between the above two methods according to the actual situation. The preset length of time is the time interval between two acquisitions of bone conduction signals. For example, if the preset time length of time is set to 2 seconds, after the bone conduction signal is acquire, the bone conduction signal is acquired again after the interval of 2 seconds. After each acquisition of bone conduction signal, the audio signal is processed by this solution. In this embodiment, it is explained by taking the preset length of time of 2 seconds as an example, and in the actual use, the preset length of time may be set arbitrarily based on actual experience. Moreover, the bone conduction signals acquired in this solution is continuously collected by the bone conduction sensor. If the collection length of time is set to 10 ms, the bone conduction sensor will continuously collect bone conduction signals for 10 ms each time. Of course, the collection length of time may also be set arbitrarily and is not specifically limited here.

S102. detecting whether the bone conduction signal contains a voice signal;

It can be understood that if the wearer is speaking, the bone conduction signal acquired by the bone conduction sensor must include the wearer's voice signal. Therefore, in this solution, it is determined whether the wearer is speaking by detecting whether the bone conduction signal contains a voice signal. In this embodiment, signal processing algorithms can be used to detect whether the bone conduction signal contains a voice signal. For example, the voice activity detection (VAD) algorithm can be used to detect whether the bone conduction signal contains a voice signal. The role of the voice activity detection algorithm is to identify voice segments and non-voice segments from an audio signal, which specifically comprises the following steps:

a. calculating the spectral energy of a specified bandwidth;

For example, after calculating the audio signal through FFT (Fast Fourier Transform), the 8 kHz bandwidth is divided into 128 sub-bands, and the energy of the lower 24 sub-bands is calculated according to the following formula:

$$\sum_{k=1}^{24} |Y_2(K)|^2$$

where k represents the sub-band serial number, and $Y_2(K)$ represents the frequency domain signal of the bone conduction signal of the k-th sub-band;

b. calculating the coherence coefficient within the specified bandwidth using the following formula:

$$\Phi = \frac{\sum_{K=1}^{32} Y_1(K) * Y_2^*(K)}{\sqrt{\sum_{K=1}^{32} |Y_1(K)|^2 * \sum_{K=1}^{32} |Y_2(K)|^2}}$$

where $Y_1(K)$ represents the frequency domain signal of the microphone signal of the k-th sub-band;

c. determining whether the bone conduction signal contains a voice signal according to the coherence coefficient and the spectral energy, and the process comprises the following steps:

judging whether the coherence coefficient is less than k1;

if so, set Vad=0; if not, determining whether the spectral energy is less than k2;

if so, set Vad=0; if not, set Vad=1.

where the k1 and k2 are preset constants. If Vad=0, it is determined that bone conduction signal does not contain a voice signal; if Vad=1, it is determined that bone conduction signal contains a voice signal.

S103. if the bone conduction signal contains a voice signal, processing the audio signal by using a preset amplification gain, wherein the preset amplification gain is less than an amplification gain under normal operating status.

It should be noted that the signal amplification gain of the hearing aid refers to the difference between the output and input sound levels, and represents the amplification function of the hearing aid. Adjusting the hearing aid gain can change the volume of the hearing aid. Therefore, in this solution, bone conduction signals are collected by bone conduction sensors, it is determined whether the user is speaking or not according to the bone conduction signals, and then the change of signal amplification gain of the hearing aid is controlled according to whether the user is speaking or not. For example, when the user is speaking, the gain of the hearing aid is reduced or the hearing aid is turned off; when the user is not speaking, the hearing aid is turned on as normal.

In this solution, in order to automatically adjust the signal amplification gain of the hearing aid when the wearer is speaking or not speaking, two signal amplification gains, i.e., the preset amplification gain and the amplification gain under normal operating status, may be set in advance. The preset amplification gain is less than the amplification gain under normal operating status. The amplification gain under normal operating status is mainly used to process audio signals when the user is not speaking. The preset amplification gain is mainly used to process audio signals when the user is speaking. The preset amplification gain and the amplification gain under normal operating status may be set in advance according to user needs. Therefore, in the present disclosure, different effects can be produced by setting the values of the two signal amplification gains. For example, if the preset amplification gain is set to be greater than zero and less than the amplification gain under normal operating status, it indicates that the current effect of the hearing aid is to reduce the audio amplification function of the hearing aid. At this moment, the wearer can not only hear his own voice through bone conduction, but also hear the amplified audio through the hearing aid; however, at this moment, the volume of the audio amplified by the hearing aid that the wearer hears is less than the volume of the audio amplified when the wearer does not speak, so it can reduce the volume of the sound of the wearer himself that the wearer hears through the bone conduction, so as to prevent the change of the wearer's subjective feeling of the volume or timbre and the influence on the hearing aid wearing experience. If the preset amplification gain is set to zero, it is equivalent to turning off the audio amplification function of the hearing aid. At this moment, the external audio will not be amplified, so that the wearer can hear his own voice through bone conduction, and the timbre and volume will not change.

In sum, in this solution, based on the accuracy of acquiring bone conduction voice signals by bone conduction sensors, it can be accurately judged whether the wearer is currently speaking, so as to automatically control the hearing aid to reduce the gain of own voice air conduction signals, so that after the user wears the hearing aid, the subjective feelings of their own voice before and after wearing the hearing aid are consistent, thereby improving the wearing experience of the hearing aid wearer, which has important social significance and value.

Figure 2:
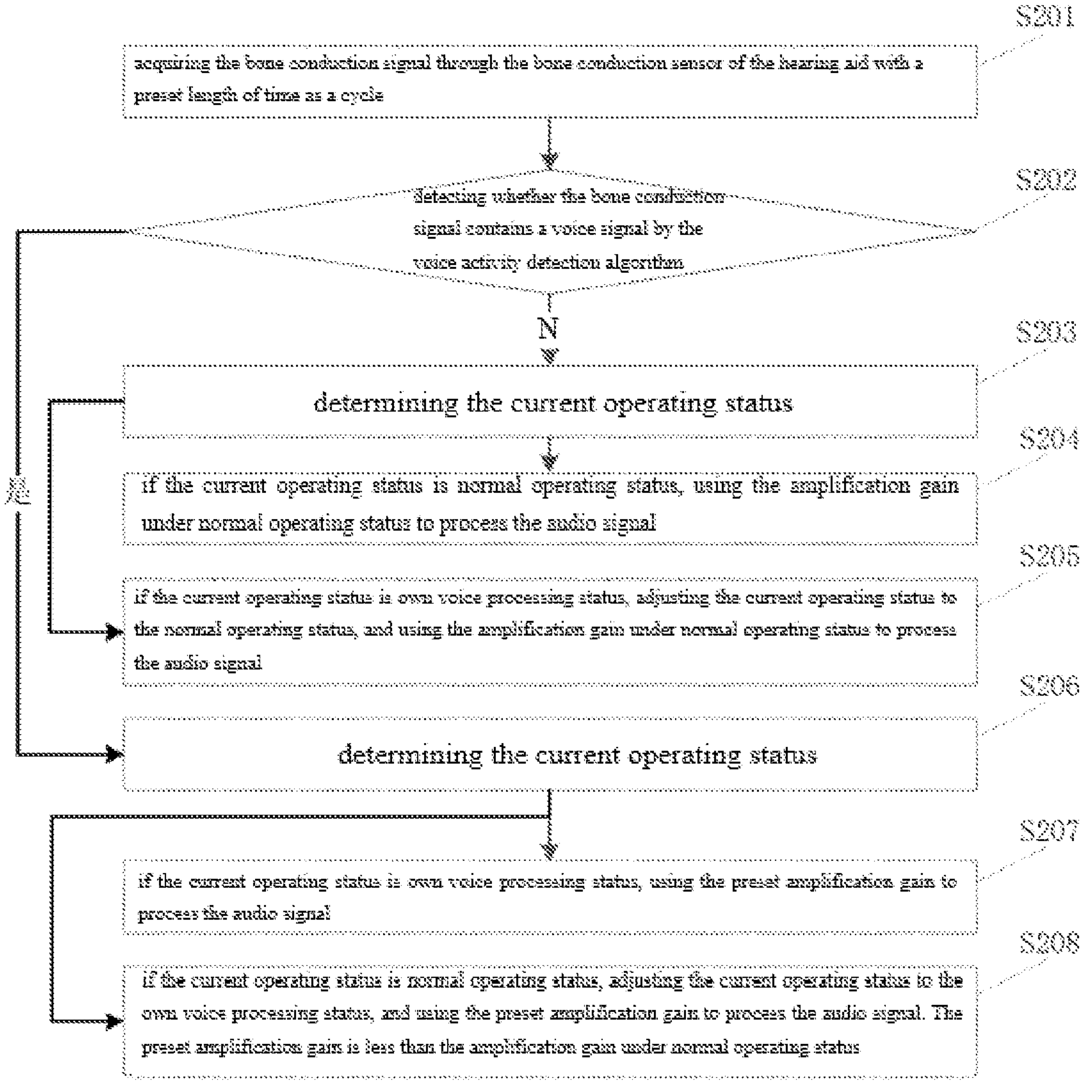
FIG. 2 is a flowchart of another audio signal processing method according to an embodiment of the present disclosure.

Refer to FIG. 2, which is the flowchart of another audio signal processing method according to an embodiment of the present disclosure, the method is applicable to hearing aids, and specifically comprising the following steps:

S201. acquiring the bone conduction signal through the bone conduction sensor of the hearing aid with a preset length of time as a cycle;

S202. detecting whether the bone conduction signal contains a voice signal by the voice activity detection algorithm;

if not, performing S203; if so, performing S206;

S203. determining the current operating status;

S204. if the current operating status is normal operating status, using the amplification gain under normal operating status to process the audio signa;

S205. if the current operating status is own voice processing status, adjusting the current operating status to the normal operating status, and using the amplification gain under normal operating status to process the audio signal;

S206. determining the current operating status;

S207. if the current operating status is own voice processing status, using the preset amplification gain to process the audio signal;

S208. if the current operating status is normal operating status, adjusting the current operating status to the own voice processing status, and using the preset amplification gain to process the audio signal. The preset amplification gain is less than the amplification gain under normal operating status.

In this embodiment, the wearer's own voice is called the own voice, and two types of operating status, i.e., the normal operating status and the own voice processing status, are set in advance. If the bone conduction signal does not contain a voice signal, the operating status of the hearing aid is set to the normal operating status. If the bone conduction signal contains a voice signal, the operating status of the hearing aid is set to the own voice processing status. When the hearing aid processes signals, it can directly select the corresponding signal amplification gain for audio signal processing according to the operating status of the hearing aid.

Therefore, in this solution, after acquiring bone conduction signal data in each detection cycle, if it is detected that the bone conduction signal does not contain a voice signal, the current operating status of the hearing aid will be detected. If the hearing aid is in the normal operating status, the processing of this cycle will be ended. Under the normal operating status, the hearing aid will process the signal by using the amplification gain under normal operating status, and then continue to perform the processing in the next detection cycle. If the hearing aid is in the own voice processing status, the operating status of the hearing aid will be changed to the normal operating status, and the signal amplification gain of the hearing aid will be restored from the preset amplification gain to the amplification gain under normal operating status of the hearing aid. The processing of this cycle will be ended, and the next cycle of processing will be performed.

Similarly, if it is detected that the bone conduction signal contains a voice signal, the current operating status of the hearing aid will be detected. If the hearing aid is in the own voice processing status, the processing of this cycle will be ended. Under the own voice processing status, the hearing aid will process the signal by using the preset amplification gain, and the next cycle of processing will be performed. If the hearing aid is in the normal operating status, the current operating status of the hearing aid is adjusted to the own voice processing status, the signal amplification gain of the hearing aid is reduced or turned off, and the signal amplification gain of the hearing aid is adjusted from the normal operating status to the preset amplification gain. The processing of this cycle will be ended, and the next cycle of processing will continue.

In sum, in this solution, in each detection cycle, the bone conduction signal acquired by the bone conduction sensor is detected. If no voice signal is detected, it is deemed that the wearer is not speaking, and at this moment the hearing aid is set to the normal operating status; otherwise, the hearing aid is set to the own voice processing status. Under the normal operating status, the hearing aid uses the amplification gain in normal operating status to process the audio signal; under the own voice processing status, the hearing aid uses the preset amplification gain that is less than the normal operating status to process the audio signal, thereby preventing the volume and timbre from changing due to the fact that the hearing aid amplifies the wearer's own voice, so that the hearing aid wearers subjective feeling of their own voice is consistent before and after wearing, thereby improving the wearing experience of hearing aid wearers.

The following is an introduction to a signal processing apparatus, a device and a storage medium according to the embodiments of the present disclosure, which correspond to the signal processing method as described above and may be referred by each other.

Figure 3:
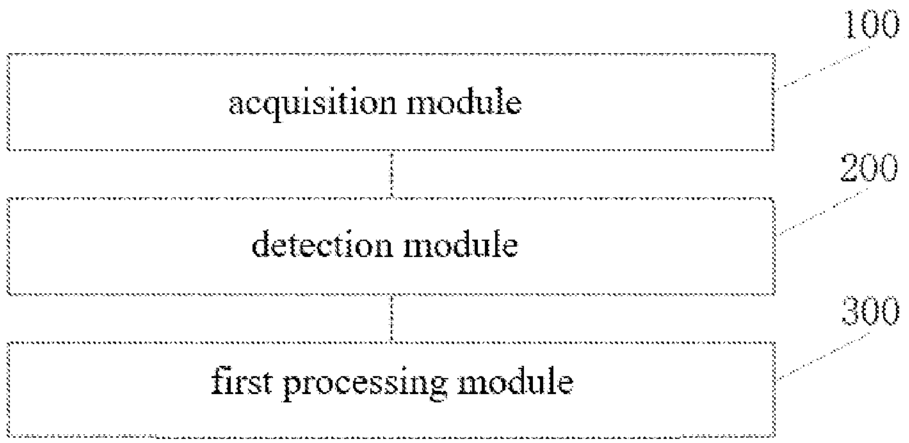
FIG. 3 is a schematic diagram of the structure of an audio signal processing apparatus according to an embodiment of the present disclosure.

Refer to FIG. 3, which is a schematic diagram of the structure of an audio signal processing apparatus according to an embodiment of the present disclosure, this apparatus is applicable to hearing aids and specifically comprises:

an acquisition module 100 for acquiring a bone conduction signal;

a detection module 200 for detecting whether the bone conduction signal contains a voice signal; and a first processing module 300 for, when the bone conduction signal contains a voice signal, processing the audio signal by using a preset amplification gain, wherein the preset amplification gain is less than an amplification gain under normal operating status.

The apparatus further comprises:

a second processing module for, when the bone conduction signal does not contain a voice signal, processing the audio signal by using the amplification gain under normal operating status.

The apparatus further comprises:

a first state determination module for determining current operating status; if the current operating status is normal operating status, triggering the second processing module; and a first adjustment module for, when the current operating status is own voice processing status, adjusting the current operating status to the normal operating status, and triggering the second processing module.

The apparatus further comprises:

a second state determination module for determining current operating status: if the current operating status is the own voice processing status, triggering the first processing module;

a second adjustment module for, when the current operating status is normal operating status, adjusting the current operating status to the own voice processing status, and triggering the first processing module.

The acquisition module is specifically for acquiring the bone conduction signal by a bone conduction sensor of the hearing aid with a preset length of time as a cycle.

The detection module is specifically for detecting whether the bone conduction signal contains a voice signal by a voice activity detection algorithm.

Figure 4:
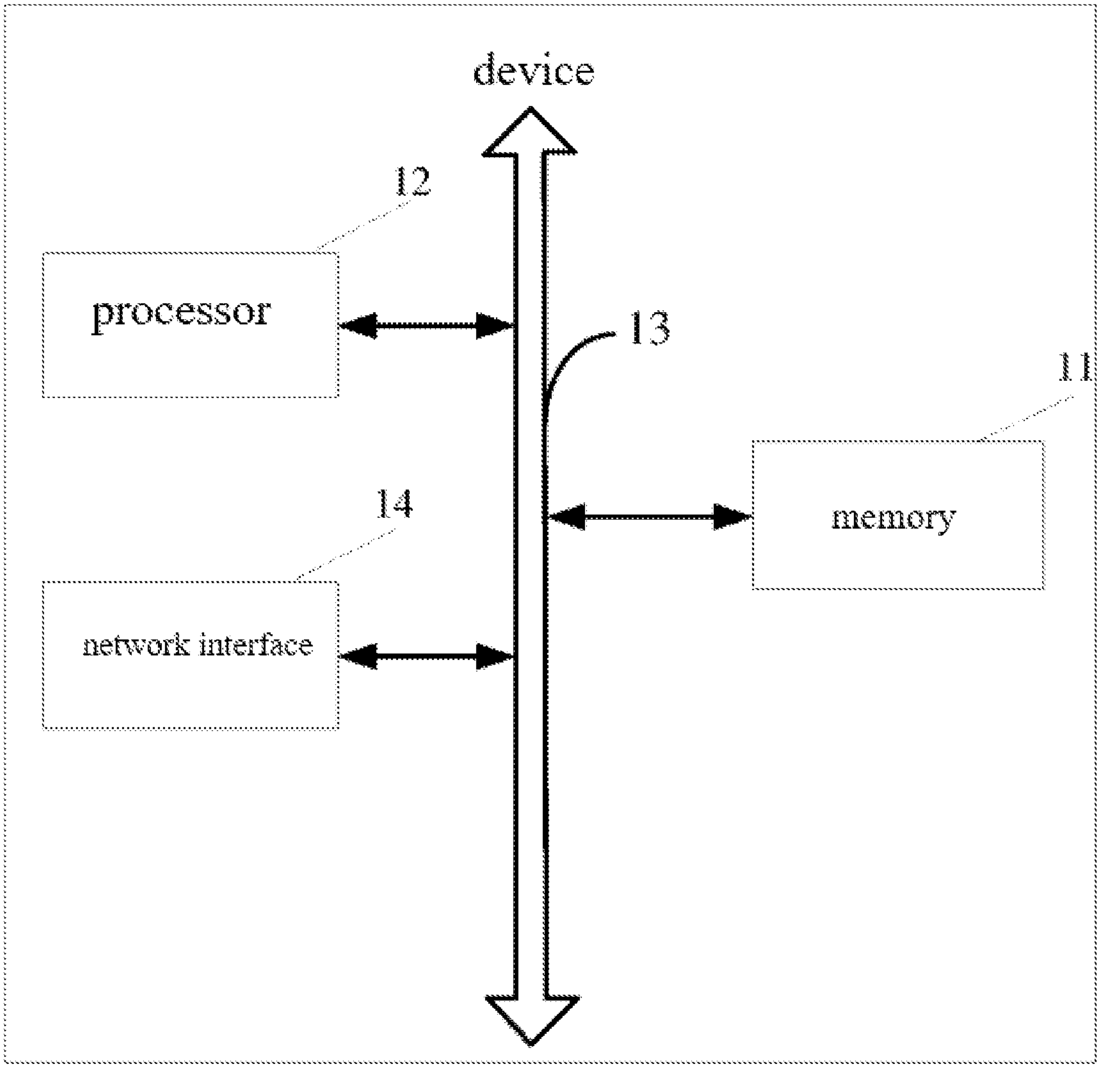
FIG. 4 is a schematic diagram of the structure of an electronic device according to an embodiment of the present disclosure.

Refer to FIG. 4, which is a schematic diagram of the structure of an electronic device according to an embodiment of the present disclosure, the electronic device comprises:

a memory 11 for storing a computer program; and a processor 12 for implementing the steps of the audio signal processing method as described in any of the above method embodiments when executing the computer program.

In this embodiment, the electronic device is a hearing aid device. The device may comprise the memory 11, the processor 12, as well as a bus 13 and a network interface 14.

The memory 11 includes at least one type of readable storage medium, it may also include both internal storage units of the device and external storage devices. The memory 11 can not only be used to store the application software installed on the device and various kinds of data, such as the program code for executing the audio signal processing method, but also be used to temporarily store the data that has been output or will be output.

In some embodiments, the processor 12 may be a central processing unit (CPU), a controller, microcontroller, a microprocessor or other data processing chip, and is used to run the program code or processing data stored in the memory 11, such as the program code for executing the audio signal processing method.

The bus 13 may be a peripheral component interconnect (PCI) bus or an extended industry standard architecture (EISA) bus. The bus can be divided into address bus, data bus, control bus, etc. For ease of representation, only one thick line is used in FIG. 4, but it does not mean that there is only one bus or one type of bus.

Further, the device may further comprise a network interface 14. Optionally, the network interface 14 may include a wired interface and/or a wireless interface (such as a WI-FI interface, a Bluetooth interface, etc.), which is usually used to establish a communication connection between the device and other electronic devices.

FIG. 4 shows the device with components 11-14 only. It will be appreciated by those skilled in the art that the structure shown in FIG. 4 does not limit the device, and it may comprise fewer or more components than the structure shown in FIG. 4, or have combinations of some components, or have different component arrangements.

An embodiment of the present disclosure also provides a computer-readable storage medium. A computer program is stored on the computer-readable storage medium. When the computer program is executed by a processor, the steps of the audio signal processing method as described in any of the above method embodiments are implemented.

The storage medium may include various media that can store program codes, such as U disk, mobile hard disk, read only memory (ROM), random access memory (RAM), magnetic disc, optical disc, etc.

The embodiments in this specification are described in a parallel or progressive manner. Each embodiment focuses on the differences from other embodiments. The same or similar parts of each embodiment may be referred by each other. As for the devices disclosed in the embodiments, since they correspond to the methods disclosed in the embodiments, their description is relatively simple, and relevant parts may refer to the description of the method part.

Those skilled in the art will also understand that the units and algorithm steps of the examples described in conjunction with the embodiments disclosed herein can be implemented in electronic hardware, computer software or a combination thereof. In order to clearly illustrate the interchangeability of hardware and software, the composition and steps of the examples have been generally described in the above description according to functions. Whether these functions are implemented in hardware or software depends on the specific application and design constraints of the technical solution. Those skilled in the art may use different methods to realize the described functions for each specific application, but such realization shall not be considered beyond the scope of the present disclosure.

The steps of a method or algorithm described in conjunction with the embodiments disclosed herein may be directly implemented by hardware, by software module executed by a processor, or by a combination of hardware and software. The software module may be placed in a random access memory (RAM), an internal memory, read only memory (ROM), an electrically programmable ROM, an electrically erasable programmable ROM, a register, a hard disk, a removable disk, a CD-ROM, or any other form of storage medium known in the art.

It should also be noted that, relational terms such as first and second used herein are only to distinguish one entity or operation from another, and do not necessarily require or imply that there is such actual relationship or order among those entities or operations. Moreover, the terms “comprise”, “include” or any other variants are intended to cover non-exclusive inclusion, so that the process, method, article or apparatus including a series of elements may not only include those elements, but may also include other elements not stated explicitly, or elements inherent to the process, method, articles or apparatus. Without more limitations, an element defined by the phrase “comprising a . . . ” does not exclude the case that there are other same elements in the process, method, article or apparatus including the element.

The following detailed description is merely exemplary in nature and is not intended to limit the invention or the application and uses of the invention. Furthermore, there is no intention to be bound by any theory presented in the preceding background of the invention or the following detailed description.

What is claimed is:

1. An audio signal processing method applicable to a hearing aid, comprising the steps of:

receiving turn-on command triggered actively by the user, acquiring a bone conduction signal;

detecting whether the bone conduction signal contains a voice signal; and if the bone conduction signal contains a voice signal, determining current operating status;

if the current operating status is own voice processing status, performing the step of processing the audio signal by using the preset amplification gain; and if the current operating status is normal operating status, adjusting the current operating status to the own voice processing status, and performing the step of processing the audio signal by using the preset amplification gain, wherein the preset amplification gain is less than an amplification gain under normal operating status, if the bone conduction signal does not contain a voice signal, determining current operating status;

if the current operating status is normal operating status, performing the step of processing the audio signal by using the preset amplification gain under normal operating status, if the current operating status is own voice processing status, adjusting the current operating status to the own voice processing status, and performing the step of processing the audio signal by using the preset amplification gain under normal operating status.

2. The audio signal processing method according to claim 1, wherein the step of acquiring the bone conduction signal comprises: acquiring the bone conduction signal by a bone conduction sensor of the hearing aid with a preset length of time as a cycle.

3. The audio signal processing method according to claim 1, wherein the step of detecting whether the bone conduction signal contains a voice signal comprises:

detecting whether the bone conduction signal contains a voice signal by a voice activity detection algorithm.

4. An audio signal processing apparatus applicable to a hearing aid, comprising:

an acquisition module for receiving turn-on command triggered actively by the user and acquiring a bone conduction signal;

a detection module for detecting whether the bone conduction signal contains a voice signal; and a first processing module for, when the bone conduction signal contains a voice signal, processing the audio signal by using a preset amplification gain, wherein the preset amplification gain is less than an amplification gain under normal operating status, a second processing module for, when the bone conduction signal does not contain a voice signal, processing the audio signal by using the amplification gain under normal operating status, a first state determination module for determining current operating status when the bone conduction signal contains a voice signal; if the current operating status is normal operating status, triggering the second processing module, if the current operating status is own voice processing status, triggering a first adjustment module; and the first adjustment module for, adjusting the current operating status to the normal operating status, and triggering the second processing module, a second state determination module for determining current operating status when the bone conduction signal does not contain a voice signal; if the current operating status is the own voice processing status, triggering the first processing module, if the current operating status is normal operating status, triggering a second adjustment module;

the second adjustment module for, adjusting the current operating status to the own voice processing status, and triggering the first processing module.

5. An electronic device, comprising:

a memory for storing a computer program; and a processor for implementing the steps of the audio signal processing method according to claim 1 when executing the computer program.

6. A computer-readable storage medium having a computer program stored thereon, wherein when the computer program is executed by a processor, the step of the audio signal processing method according to claim 1 is implemented.

7. An electronic device, comprising:

a memory for storing a computer program; and a processor for implementing the steps of the audio signal processing method according to claim 2 when executing the computer program.

8. An electronic device, comprising:

a memory for storing a computer program; and a processor for implementing the steps of the audio signal processing method according to claim 3 when executing the computer program.

9. A computer-readable storage medium having a computer program stored thereon, wherein when the computer program is executed by a processor, the step of the audio signal processing method according to claim 5 is implemented.

10. A computer-readable storage medium having a computer program stored thereon, wherein when the computer program is executed by a processor, the step of the audio signal processing method according claim 6 is implemented.

* * * * *